Patented Dec. 6, 1938

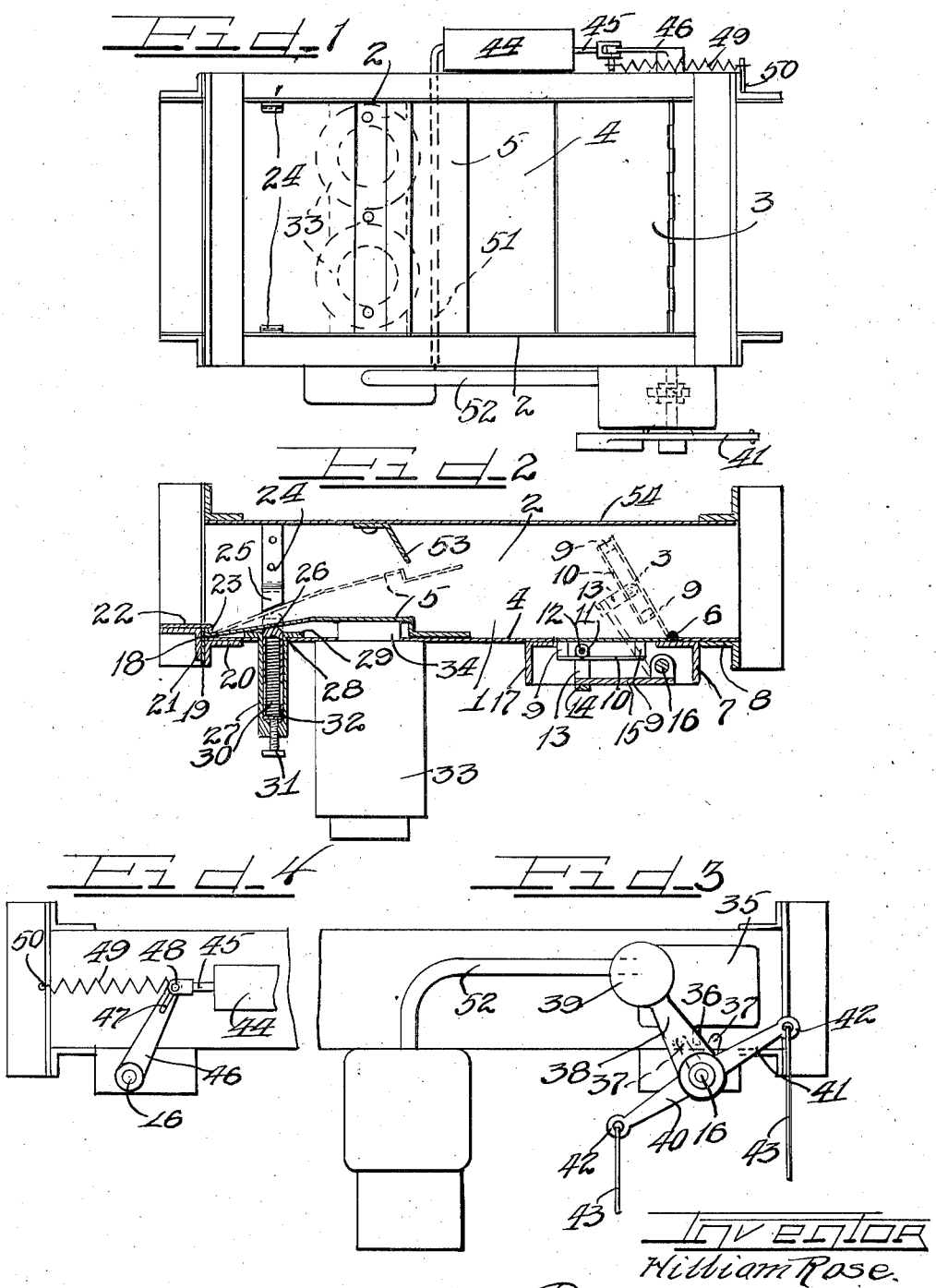

2,139,468

UNITED STATES PATENT OFFICE 2,139,468

MAGNETIC SEPARATOR

William Rose, Chicago, Ill., assignor to B. F. Gump Co., Chicago, Ill., a corporation of Illinois Application May 6, 1936, Serial No. 78,094

9 Claims. (Cl. 209—228)

This invention relates to a magnetic separator and involves certain improvements over the structure disclosed in my copending application Serial No. 741,056, filed August 23, 1934.

Among the improved features over the structure shown in my copending application may be mentioned, the pivoting of the movable magnetizable plate at its forward end and tilting the rear end upwardly by means of a compression spring for bringing the same into jarring relation with stop members to dislocate and jar off the metal clinging thereto.

A further improved feature resides in a leveling plate that forces the material to pass thereunder so that the metal substances in the material will be caused to move sufficiently close to the magnetic plate to be attracted thereby.

Another improved feature resides in connecting the trap door shaft with a solenoid which becomes de-energized when the current fails for allowing a spring to act for opening the trap door so that material will flow through the trap door thuswise preventing material with metals from passing into the mill in the event that the magnetic plate becomes inoperative.

The invention comprises the novel structure and combination of parts hereinafter described and more particularly pointed out and defined in the appended claims.

In the accompanying drawing which illustrates a preferred form of this invention and in which similar reference numerals refer to similar features in the different views:

Figure 1 is a top plan view of my improved magnetic separator with the cover removed;

Figure 2 is a sectional view through the magnetic separator with the cover in place;

Figure 3 is a fragmentary elevational view of one side of the magnetic separator; and Figure 4 is a fragmentary elevational view of a portion of the other side of the magnetic separator.

In order to set forth this invention, there has been shown a chute 1 through which coffee beans or grains are adapted to pass for removal of nails, wire or metals therefrom. This chute has side walls 2 and a bottom which is formed by a trap door 3, a stationary bottom plate 4 and magnetizable plate 5.

The trap door 3 is hinged as indicated at 6 to the rear portion of the floor which may be formed by the adjacent angle members 7 and 8. This trap door 3 has spaced lugs 9 upon the bottom thereof and these spaced lugs 9 have a plate 10 attached thereto whereby a closed guideway is formed for the reception of a roller 11 journalled upon a stud 12 carried by the upper ends of the arms of a closed yoke 13. The closed end 14 of the yoke is connected to a bar 15 that is rigidly secured to a transverse shaft 16 which is suitably supported beneath the chute.

The floor plate 4 which may be attached to the sides 2 of the chute is also supported at its forward end by a transverse angle bar 17 that increases the thickness of the bottom at the forward end of the trap door 3.

The magnetizable plate 5 is pivoted at its rear end to the bottom of the chute for upward pivotal movement. This pivotal connection between the plate 5 and the bottom of the chute may be effected in any suitable manner. In the present instance, however, a very simple pivotal connection has been provided and it consists of an upturned end 18 on the front end of the plate 5 that abuts a suitable liner 19 that is positioned between the angle bar 20 that supports the forward end of the plate 4 and the angle bar 21 which is attached transversely at the forward end of the chute. It will be noted that the angle bars 20 and 21 are positioned back to back with the angle bar 21 at a higher elevation corresponding substantially to the upturned end 18 on the plate 5. The plate 22 is secured upon the horizontal flange of the angle bar 21 and the inner end of this plate has a downturned end 23 that loosely overlaps the upturned end 18 of the magnetizable plate 5. The groove formed between the liner 19 and the downturned lip 23 that receives the upturned end 18 on plate 5 provides sufficient room or looseness for the plate 5 to tilt upwardly as shown in dotted lines.

The upward swinging movement of the plate 5 is limited by brackets 24 having lower inwardly offset ends 25 cut on a bias that are located in the path of movement of the plate 5. The plate 5 is quickly projected upwardly as will later appear and when it strikes the stops, it will be given a sudden jarring action that will dislocate any metal clinging thereto and cause the same to travel over the free end thereof. It might be mentioned that the chute 1 is designed to be installed at such an inclined angle that the plate 5 in elevated position will have a sufficient downward slope for the free movement of the metals therefrom by gravity.

The plate 5 is adapted to be swung upwardly when it is de-energized by means of a spring pressed plunger 26 which is slidably mounted in a cylinder 27 attached to the plate 4. The manner of attaching the cylinder to plate 4 in the present instance consists in forming a suitable aperture 28 in the plate 4 to receive the cylinder and flanging the upper end of the cylinder over the plate as indicated at 29. A coil spring 30 within the cylinder 27 extends into the plunger 26 which is hollow for such a purpose. The spring 30 may be adjusted by means of a screw 31 threaded in the lower end of the cylinder housing 27 and engaging a cap 32 on the lower end of the spring; the plunger terminating a suitable distance above such cap.

The magnetizable plate is adapted to be energized when the apparatus is in use by means of electromagnets 33 which are supported below the bottom of the chute and have poles 34 extending through apertures in the plate 4 and into contact with plate 5 which it will be noted has an intermediate upwardly offset portion. The current for the electromagnets may come from any suitable source available.

The current for supplying the electromagnets 33 passes through a switch box 35. The switching mechanism may be of any conventional type and for this reason it has not been specifically illustrated. The switch lever 36, however, is shown extending from the switch box and between a pair of diverging fingers 37 integral with the bar or shaft 16 which extends under the switch box.

Upon the outer end of the shaft 16 there is secured an arm 38 having a weight 39 thereon for holding the shaft 16 in trap door open or closed positions and assisting in rocking said shaft when said arm moves beyond dead center in either direction. The hub of the arm 38 is shown as provided with the radially extending arms 40 and 41 with eyelets 42 for receiving operating cables 43 whereby the shaft 16 may be rocked for opening and closing the switch and opening and closing the trap door.

A safeguard has been provided for automatically opening the trap door 3 in the event that the current or electromagnets 33 fail so that the material flowing through the chute will drop through the trap door opening and will not pass into the mill in connection with which this apparatus is used. In the present instance, a solenoid 44 is supported upon the opposite side of the chute from the switch box. The core rod 45 of this solenoid is pivotally connected to a crank arm 46 rigidly secured upon the shaft 16 as shown in Figure 4. The crank arm 46 is provided with a slot 47 through which the pivot pin 48 that connects the core rod 45 with the crank arm extends to provide for the arcuate movement of the said pin. A spring 49 is attached at one end to the pin 48 and at its other end to a pin 50 on the frame of the chute. The effect of the solenoid 44 will tend to hold the trap door in closed position, but in the event that the current or electromagnets fail so as to de-energize the solenoid, the spring will automatically rock the shaft 16 through the crank 46 for opening the trap door. It will of course be appreciated that as soon as the counterweight 39 passes on either side of a vertical plane thru the center of shaft 16, it will swing or assist in swinging the trap door to either of its extreme limits of movement.

In order to accomplish the automatic opening of the trap door, it is of course necessary that the solenoid 44 be in the same circuit as the electromagnets 33. To this end, electrical connections 51 are shown in dotted lines leading from the solenoid to the electromagnets which in turn have electrical connections 52 with the switch box.

In order to properly regulate the depth of the stream of material passing through the chute, a rearwardly inclined gauge plate 53 (Figure 2) is attached to the removable cover 54. This plate will cause the material to travel sufficiently close to the magnetizable plate 5 so that any metal in such material will be attracted by the plate.

It will be appreciated that as soon as the flow of material through the chute is cut off and the switch is opened, the plate 5 will become demagnetized or de-energized with the result that the spring pressed plunger will become effective for suddenly elevating said plate 5 and causing it to strike the stops 24 for imparting a jarring action thereto to cause the metals clinging thereto to bounce therefrom over the free end thereof. When the plate 5 is deenergized through the de-energizations of the electro-magnets 23, and is tilted upwardly, the magnet 44 also becomes de-energized and allows the spring 49 to rock the crank 46 and shaft 16 to automatically elevate the trap door 3 as shown in dotted lines in Fig. 2 to intercept the metals descending over the tilted plate 5 to pass through the trap door opening.

It will of course be understood that the spring 30 is easily overcome by the magnetic force of the electromagnets 33 which will automatically draw the plates 5 downwardly from its tilted position as soon as the same are energized. The spring 49 is likewise of such a character that it will be overcome by the force of the solenoid 44 so as not to be effective for opening the trap door when the current is turned on.

From the foregoing, it will be appreciated that a very reliable and efficient magnetic separator has been provided in which no metal can remain upon the magnetic plate due to magnetism imparted thereto, and which is readily and automatically controlled.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a magnetic separator, a chute through which material is adapted to pass, said chute having side walls, a magnetizable plate hinged in the bottom of the chute for upward tilting movement and adapted for attracting metals, electromagnetic means acting upon said plate for magnetizing the same, yielding means acting upon said plate for tilting the forward end of the same upwardly when said electromagnetic means is de-energized and stops upon the side walls of said chute for arresting the upward tilting movement of said plate, and jarring the same for dislocating the metals clinging thereto, said chute having a trap door opening in advance of said plate, said plate discharging the metals over its free edge for falling thru said trap door opening.

2. In a magnetic separator, a chute having side walls through which material is adapted to pass, a magnetizable plate hinged in the bottom of the chute for upward tilting movement and adapted for attracting metals, electro-magnets for magnetizing said plate and normally retaining the same in the bottom of the chute, yielding means acting upon said plate for tilting the forward end of the same upwardly when said magnets are de-energized, and stops upon the side walls of said chute for arresting the upward tilting movement of said plate in an inclined position and jarring the same for dislocating the metals clinging thereto whereby said metals are discharged over the free end of said plate.

3. In a magnetic separator, a chute thru which material is adapted to pass, said chute having side walls, a magnetizable plate hinged in the bottom of the chute adapted for attracting metals, electro-magnets beneath said chute for magnetizing said plate, yielding means for tilting the forward end of said plate upwardly when said magnets are de-energized, stops upon said side wall for arresting said plate in an inclined position and jarring the same for discharging the metals clinging thereto over the forward end thereof, a trap door in the bottom of the chute and means responsive to said electro-magnets for automatically opening said trap door when said magnets are de-energized for the passage of said metals.

4. In a magnetic separator, a chute through which material is adapted to pass, a magnetizable plate hinged in the bottom of the chute adapted for attracting metals, electro-magnets beneath said chute for magnetizing said plate, yielding means for tilting the forward portion of said plate upwardly when said magnets are de-energized for discharging metal over the forward edge thereof, a trap door in the bottom of the chute, a shaft beneath said chute, a slidable connection between said shaft and trap door, a crank arm upon said shaft, a solenoid responsive to said electro-magnets connected to said crank and yielding means connected to said crank arm in opposed relation to the action of said solenoid for rocking said shaft and opening said trap door for the escape of said metals when said magnets are de-energized.

5. In a magnetic separator, a chute through which material is adapted to pass, a magnetizable plate hinged in the bottom of the chute and adapted for attracting metals, electro-magnets beneath said chute for magnetizing said plate, yielding means for tilting the forward portion of said plate upwardly when said magnets are demagnetized, means in the path of said plate for jarring the same for discharging the metals over the forward edge thereof, a trap door hinged in the bottom of the chute in advance of said magnetizable plate, a shaft beneath said chute, a lost motion connection between said shaft and trap door, a crank arm upon said shaft, a solenoid responsive to said magnets pivotally connected to said crank arm for maintaining said trap door in closed position, and means for rocking said shaft for opening said trap door when said magnets are de-energized.

6. In a magnetic separator, a chute having side walls through which material is adapted to pass, a magnetizable plate hinged in the bottom of the chute adapted for collecting metals, electro-magnets beneath said chute for magnetizing said plate, spring pressed plungers beneath said plate effective for tilting the forward portion of said plate upwardly when said magnets are de-energized, stops having lower inclined ends secured to said side walls for arresting and jarring said plate in inclined position for dislocating any metals clinging thereto, a trap door in the bottom of said chute, and means responsive to the de-energization of said magnets for opening said trap door for the discharge of metals from said plate.

7. In a magnetic separator, a chute through which material is adapted to pass, a magnetizable plate hinged in the bottom of the chute, electro-magnets beneath said chute for magnetizing said plate for collecting metals from said material, means for tilting the forward portion of said plate upwardly and jarring the same for discharging the metals over the upwardly tilted end thereof, a trap door in the bottom of the chute in advance of said plate, a shaft journaled beneath said chute, a connection between said shaft and trap door, a counterweight secured to said shaft effective for rocking said shaft when said weight moves beyond dead center, means connected to said shaft and responsive to said electro-magnets for maintaining said trap door in closed position, and yielding means for rocking said shaft for opening said trap door when said magnets are de-energized.

8. In a magnetic separator, a chute through which material is adapted to pass, a magnetizable plate hinged in the bottom of the chute and having an intermediate upwardly offset portion, electro-magnets beneath said chute having pole pieces extending into said offset portion for magnetizing said plate for collecting metals, spring pressed plungers beneath said plate for tilting the forward end upwardly when said magnets are de-energized, stop means upon said chute for arresting and jarring said plate when the forward portion of said plate is tilted upwardly for discharging the metals over the forward end thereof, a trap door in the bottom of the chute in advance of said plate, and means for opening said trap door when said magnets are de-energized.

9. In a magnetic separator, a chute through which material is adapted to pass, said chute having side walls, a magnetizable plate disposed in the chute for tilting movement and adapted for attracting metals, electromagnetic means acting upon said plate for magnetizing the same, means acting upon said plate for tilting an end of the plate upwardly when said electromagnetic means is de-energized, means for limiting the upward movement of the plate whereby metals clinging thereto may be dislodged therefrom, said chute having an opening in advance of said plate, said plate discharging the metal over its discharge end for falling through said opening, and baffle means in said chute adjacent and over the discharge end of said plate for compacting the flowing material through said chute at the discharge end of said electromagnetic means and while the material is being subjected to the strongest magnetic flux of said plate but before said material is discharged therefrom.

WILLIAM ROSE.